US006016511A

United States Patent [19]
Cook

[11] Patent Number: 6,016,511
[45] Date of Patent: Jan. 18, 2000

[54] APPARATUS AND METHOD FOR INTERFACING PROTOCOL APPLICATION DATA FRAME OPERATION REQUESTS WITH A DATA FRAME INPUT/OUTPUT DEVICE

[75] Inventor: Steven R. Cook, Franklin, Mass.

[73] Assignee: Motorola Inc., Schaumburg, Ill.

[21] Appl. No.: 08/938,947

[22] Filed: Sep. 12, 1997

[51] Int. Cl.[7] .......................... G06F 13/38; G06F 15/17
[52] U.S. Cl. ......................... 709/236; 710/4; 709/230
[58] Field of Search .................... 709/236, 238, 709/246, 230, 300, 301, 302, 250, 234; 710/3, 4

[56] References Cited

U.S. PATENT DOCUMENTS

| | | | |
|---|---|---|---|
| 5,237,662 | 8/1993 | Green et al. | 709/100 |
| 5,299,313 | 3/1994 | Petersen et al. | 709/234 |
| 5,488,724 | 1/1996 | Firoozmand | 709/236 |
| 5,515,508 | 5/1996 | Pettus et al. | 709/230 |
| 5,729,681 | 3/1998 | Aditya et al. | 709/230 |
| 5,765,032 | 6/1998 | Valizadeh | 709/238 |
| 5,797,041 | 8/1998 | Yasue et al. | 709/250 |
| 5,892,925 | 4/1999 | Aditya et al. | 709/230 |
| 5,894,557 | 4/1999 | Bade et al. | 709/301 |

OTHER PUBLICATIONS

Alexander et al.; "Integrating the Portable APPN Protocol Stack into a Multiprotocol Router"; Southeastcon 95, Visualize the Future, proceedings, IEEE; pp. 133–141; IEE 0–7803–2642–3/95, Mar. 1995.

Lin et al.; "Distributed Network Computing over Local ATM Networks"; IEEE Journal on Selected Areas in Communication; vol. 13, No. 4; pp. 733–748; IEEE 0733–8716/95, May 1995.

Nicolaisen, Nancy; "Save time with Power TCP's socket programming—if you dare"; Computer Shopper; Ziff–Davis Publishing; v16, n1, p. 638(3), Jan. 1996.

Software review; "Networking Roundup, Harris & Jeffries' Frame Relay–To–ATM Service"; Newsbytes; Newsbutes Inc., Sep. 1996.

Masel et al.; "Microcode upgrade aids frame/ATM link"; Electronic Enigeering Times; n919 p50(1), Sep. 1996.

Primary Examiner—Mark H. Rinehart
Assistant Examiner—Marc D Thompson
Attorney, Agent, or Firm—John W. Powell; Joanne N. Pappas

[57] ABSTRACT

A method and apparatus for interfacing protocol application data frame operation requests with a data frame input/output device having a buffer structure containing data frames according to a buffer structure scheme, while maintaining isolation between the buffer structure and the protocol applications, including: receiving, with an interface, from a protocol application a data frame operation request for operation on a portion of an identified data frame within the buffer structure; linking, with the interface, the request to an appropriate data frame operation routine in the data frame input/output device; and the data frame operation routine executing the request, in conjunction with the protocol application, on the portion of the identified data frame without requiring that the protocol application have knowledge of the buffer structure scheme.

43 Claims, 4 Drawing Sheets

APPARATUS AND METHOD FOR
INTERFACING PROTOCOL APPLICATION
DATA FRAME OPERATION REQUESTS
WITH A DATA FRAME INPUT/OUTPUT
DEVICE

FIELD OF INVENTION

This invention relates to an apparatus and method for interfacing protocol application data frame operation requests with a data frame input/output device having a buffer structure containing data frames, and more particularly to such an apparatus and method which avoids frame copying by protocol applications, yet isolates the buffer structure of the frame I/O device from the protocol applications.

BACKGROUND OF INVENTION

In communications networks, data, voice and video may be transported in data frames. A data frame consists of a variable number of ordered octets. The boundaries of the frame are delimited by some protocol, e.g. HDLC, on a physical communication medium. For purposes of this discussion "data frame" refers to the logical level, i.e., after the contents of the frame have been extracted from the envelope. In the networks, or at the edges of the networks, the data frames are input to and output from various network devices, such as routers and frame relay switches, through the frame I/O of the devices. The devices include protocol applications, such as HDLC, X.25, Frame Relay, Ethernet, etc., which perform various operations on the data frames, e.g., reading and writing, in order to manipulate the data frames according to the particular protocol, as is well known in the art.

When the data frames are received by a network device, the frame I/O removes the envelope and buffers the contents of the data frame in the data frame I/O buffer structure. The protocol applications then perform various functions on the data frames while they are stored, in the buffer structure. The simplest representation of a stored data frame is an array of octets stored in contiguous memory. With this representation, size of the memory must be large enough to hold the largest legal frame supportable by the protocol applications being served. Unfortunately, this representation is not the typical representation of a data frame. The typical representation of a data frame involves a buffer structure comprised of an ordered set of buffers, wherein each buffer contains an array of octets, but the size of the buffer is less than the maximum legal length frame.

The primary reasons for using the second representation is because the frames are typically maintained in memory for some period of time, rather than being immediately disposed of, and because there is usually a substantial difference between the maximum legal length frame and the average legal length frame. Thus, a significant amount of memory space can be saved. If a buffer structure having multiple buffers is not used, any time a data frame is to be received, the frame receiving hardware in the frame I/O must be provided with sufficient memory space to receive the largest legal frame.

The protocol applications perform various operations on the data frames, e.g., reading and writing, in order to manipulate the data frames (particularly the headers of the data frames) according to the particular protocols. In order to avoid copying of data frames by the protocol applications when manipulating the data frames, which impedes device performance, typically the details of the buffer structure of the frame I/O are shared with the protocol applications. This allows the applications to examine or modify the data in the data frame without requiring the applications to copy the contents of the data frame. This approach, however, is less than ideal, as the code that implements the protocol application must be entangled with the details of the scheme of a particular buffer structure. Buffer schemes are relatively complex and therefore it is rare to find different buffer implementations with compatible schemes. As a result, the protocol applications are generally not compatible with buffer implementations having different buffer schemes than the implementations and schemes with which the applications were designed to operate and therefore are not readily portable to devices having different buffer implementations.

Accordingly, a need exists for a frame I/O interface which avoids frame copying by protocol applications, yet isolates the buffer structure of the frame I/O from the protocol applications. This will allow much greater flexibility in using protocol applications with data frame I/Os having various buffer structure schemes while maintaining device performance.

DETAILED DESCRIPTION OF THE PREFERRED EMBODIMENT

Figure 1:
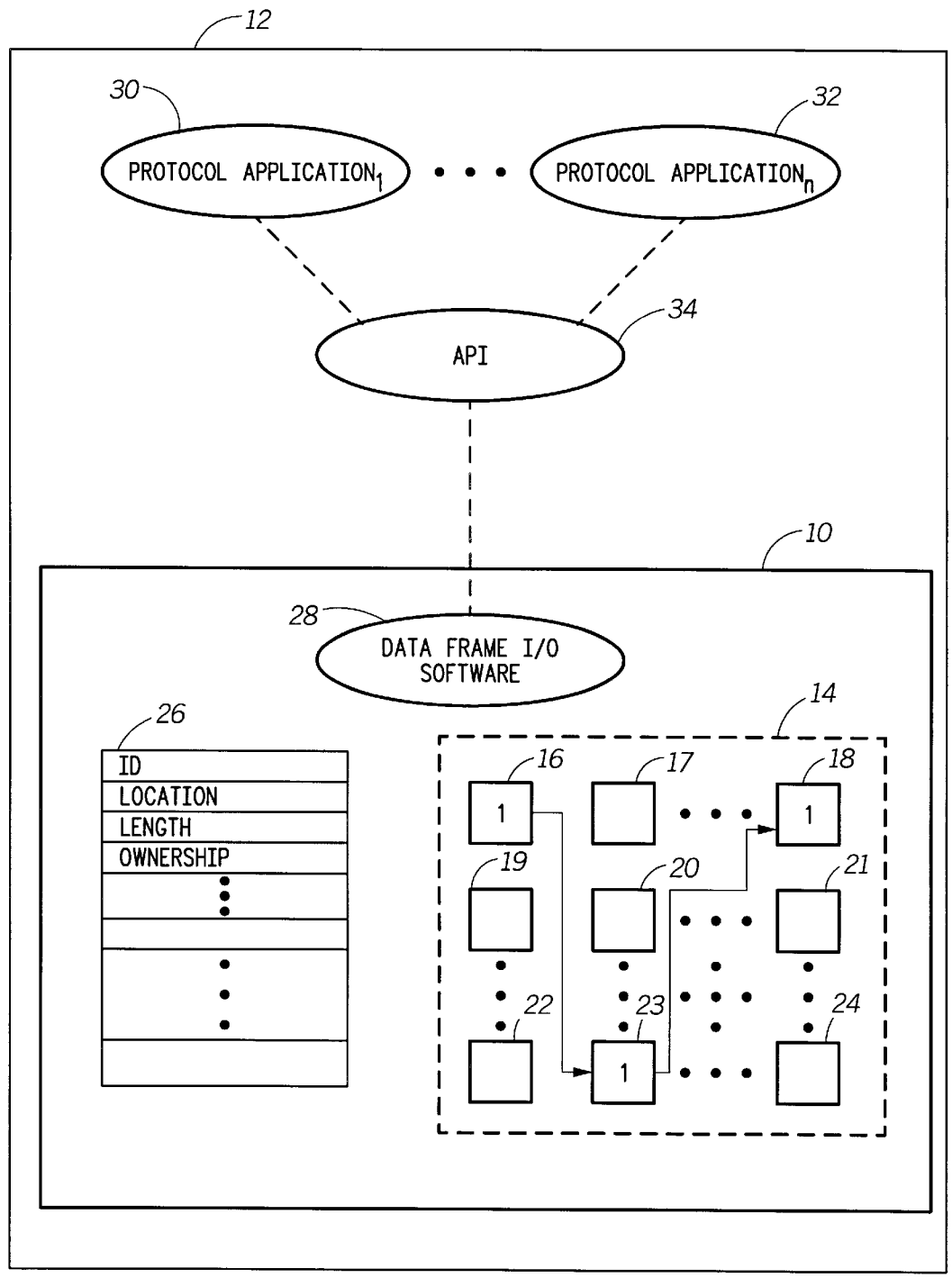
FIG. 1 is a high level representation of a data frame I/O device in a network device configured in accordance with this invention.

There is shown in FIG. 1 a high level representation of a typical data frame I/O device 10 located in, for example, network device 12. Network device 12 could be any one of a number of types of network devices, such as a router or a frame relay switch, which receive and typically output data frames after the protocol applications perform various operations on them. Data frame I/O device 10 includes a buffer structure 14 having an ordered set of memory buffers, of which only a representative group, namely, memory buffers 16–24 are depicted. Data frames received by network device 12 are input to data frame I/O device 10 and buffered in buffer structure 14. Each buffer within buffer structure 14 is capable of containing an array of octets, but the size of the buffer is less than the maximum legal frame length. Thus, data frames buffered within buffer structure 14 may be dispersed among a number of individual buffers linked according to the buffer scheme of the buffer structure. For example, a portion of a data frame designated as data frame "1" begins at some memory location within buffer 16 and occupies the remaining memory space of buffer 16. Another portion of data frame "1" occupies all of the memory space in buffer 23 and the remainder of data frame "1" occupies all or some portion of buffer 18. This buffer scheme is just exemplary and different buffer implementations will have different schemes.

As is known in the art, a data frame I/O device, such as data frame I/O device 10, must maintain information on the location and status of data frames stored within its buffer structure. This is accomplished with frame data structure 26 that contains information about data frames stored within buffer structure 14, such as the frame number (ID), the location of the first buffer of the data frame, the length of the frame and ownership of the frame (i.e. which protocol application presently has control of the frame)... etc. Under the control of data frame I/O software 28, as each frame is received by data frame I/O device 10, the frame is allocated a frame ID from a "free list", stored in the frame location corresponding to the allocated frame ID and the frame ID information in the data structure is updated. Also, each individual buffer within buffer structure 14 contains information about the data frame, such as the next linked buffer in the data frame, the length of the present buffer and the start of data within the present buffer.

With the present invention, as each data frame is received by data frame I/O device 10, data frame I/O software 28 notifies the first protocol application by providing it the frame ID. When the first protocol application, and subsequent protocol applications, are finished with the frame, the frame ID is passed on to the next protocol application. If the frame is transmitted through a hardware port (not shown) out of network device 12, data frame I/O device 10 relinquishes control of the data frame and de-allocates the frame, thereby making that frame and its location within buffer structure 14 available (i.e., the frame is placed on the free list). Some frames that are received are not transmitted through a hardware port out of network device 12, such as frames which are used for control purposes. These frames still need to be de-allocated after the protocol applications are through with them. Thus, the last protocol application is responsible for de-allocating these types of frames.

Protocol applications, such as protocol application$_1$ 30 ... protocol application$_n$ 32, perform protocol specific operations on portions of the data frames located within buffer structure 14 of data frame I/O device 10. With the prior art approach, in order to avoid copying of data frames by the protocol applications to perform the protocol operations, the details of the buffer scheme are shared with the protocol applications. This allows the applications to examine or modify the data in the data frames stored in the buffer structure without requiring the applications to copy the portion of the data frame of interest. However, this requires that the code that implements the protocol applications be entangled with the details of the scheme a particular buffer structure. As noted above, buffer schemes are relatively complex and therefore it is rare to find different implementations with compatible schemes.

With the present invention, however, no details of the buffer structure are shared with the protocol applications. Instead, the protocol operations are carried out by the data frame I/O device 10 upon requests made by the applications. Each of the protocol applications provide their data frame operation requests to API 34 (application program interface) which then links the requests to the appropriate request routine in data frame I/O software 28 of data frame I/O device 10 by means of a jump table. As described below, the data frame I/O software 28 then instructs the protocol application where to find the portion of the data frame desired. This removes the prior art requirement of entangling the protocol applications with the scheme of the buffer structure. Data frame I/O software 28 also enables the protocol applications to perform their operations on the data frames with little or no copying of the data frames from buffer structure 14 to protocol application$_1$30 ... protocol application$_n$ 32, also described below. Thus, the present invention improves device performance by reducing or even eliminating data frame copying by protocol applications, while enabling the disentanglement of the protocol applications from the buffer schemes, thereby making the protocol applications readily portable to various buffer schemes.

A description of the present invention is provided below with reference to several basic protocol application operations; namely, ReadFrame, WriteFrame, ReadLeading and ReplaceLeading. This is not complete list and description of protocol operations and other operations according to this invention will be apparent to those skilled in the art.

ReadFrame

Figure 2:
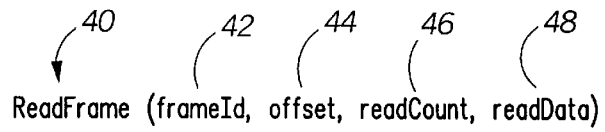
FIG. 2 is a representation of a read frame request which is provided by a protocol application to the data frame I/O device in accordance with this invention.

The basic ReadFrame operation may be requested by a protocol application when the protocol application provides API 34 with a ReadFrame request. The request 40 may be constructed as shown in FIG. 2. Request 40 includes a frame identification, "frameId", 42 indicating the particular frame that the application desires to read. A frameId of "1" indicates that the application desires to read from the data frame in buffer structure 14, FIG. 1, designated as "1". The "offset" 44 indicates the number of bytes into the selected frame that the application would like to begin reading. For example, an offset of "5" indicates the application desires to begin reading data frame "1" at byte "5". The "readCount" 46 stipulates how much of the data frame from the offset needs to be read. A count of "20" indicates that the application desires to read 20 bytes of data frame "1" starting from byte "5", i.e., bytes 5–24. The variable "readData" 48 is the address of the protocol application pointer which is described below with regard to FIG. 3.

In order to accomplish the most basic protocol operation, ReadFrame, the various protocol applications, i.e. protocol application$_1$ 30 ... protocol application$_n$ 32, are configured to store, if necessary, a copy of the portion of the data frame needed to be read by the particular application. Each application can copy the portion of the data frame desired from buffer structure 14 to protocol application memory location 50, Temp_read_string, FIG. 3, typically on the application's stack as a dynamic variable. The Temp_read_string stack location 50 is capable of storing, for example, twenty (20) bytes of data. When the application desires to utilize the read portion of the data frame, the application looks to pointer 52, which contains the address, typically four (4) bytes long, of stack location 50 to read the copied portion of the data frame.

Figure 3:
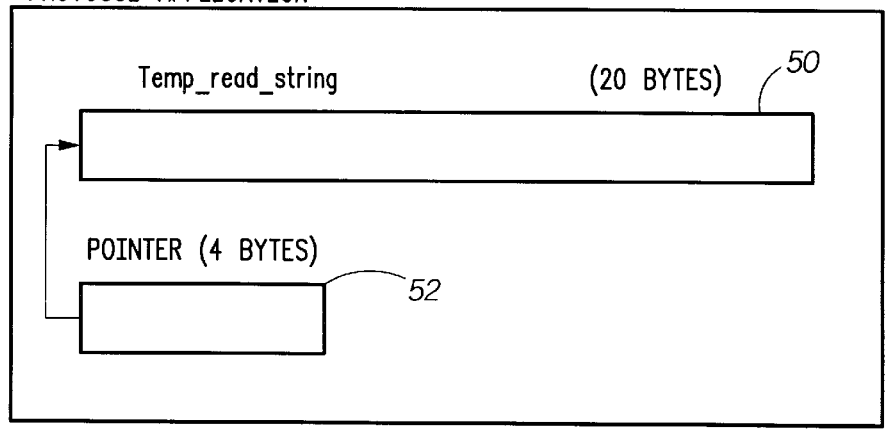
FIG. 3 is a representation of a portion of memory used by a protocol application in accordance with this invention.
Figure 4:
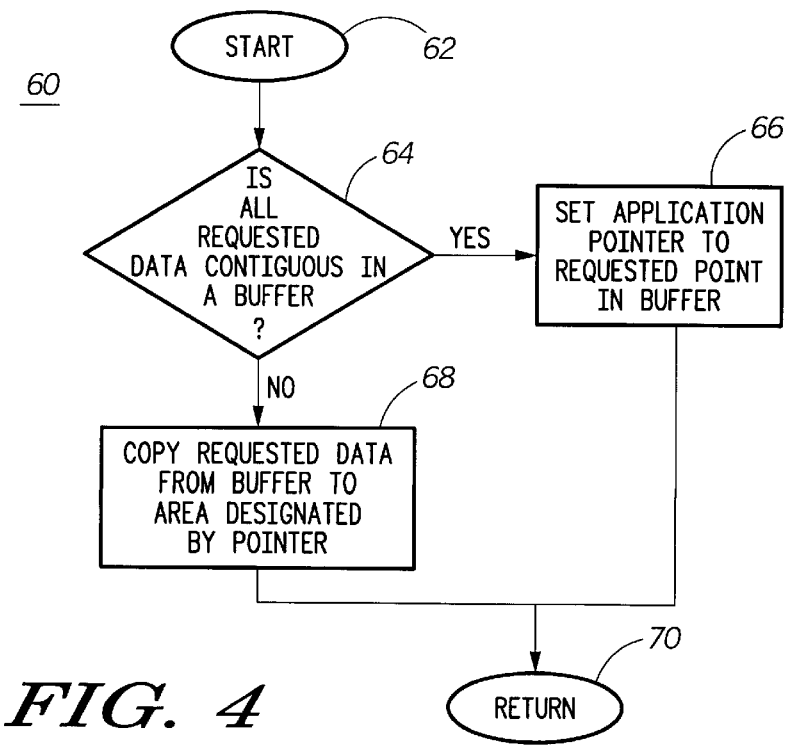
FIG. 4 is a flow chart illustrating the operation of the data frame I/O in accordance with this invention in response to a read frame request of the type shown in FIG. 2.

As indicated above, copying degrades performance. Therefore, the present invention provides the ability to execute a ReadFrame operation without requiring that the protocol application copy the portion of the data frame which it desires read. The ReadFrame operation which is carried out by data frame I/O software 28 in data frame I/O device 10 and which is depicted in flow chart 60, FIG. 4, starts at step 62 when the protocol application provides API 34 with a ReadFrame request, such as request 40, FIG. 2. API 34, using the jump table, links the request to the ReadFrame routine in data frame I/O software 28 where the ReadFrame request is executed as follows. At step 64, it is determined, from frame data structure 26 and the linked buffers which contain the data frame to be read, if all requested data, i.e. the portion of the data frame to be read, is contiguous within a single buffer. If it is, at step 66, the protocol application pointer 52, FIG. 3, is written over with the address in buffer structure, 14, FIG. 1, at the beginning of the portion of the data to be read from the requested data frame. The protocol application is designed to look to the address contained in the pointer to read the portion of the data frame requested. The protocol application initializes the pointer to contain the address of the Temp_read_string, stack location 50, FIG. 3. However, at step 66 this address is written over with the appropriate buffer structure address so that the application can read the portion of the data frame requested without having to copy the data to stack location 50 and without having knowledge of the buffer structure. If at step 64 it is determined that the portion of the data frame requested by the application does not reside in a single buffer, then at step 68 the requested data is copied to the Temp_read_string, stack location 50. When the application looks to the address contained in pointer 52 it will be directed to stack location 50 where a copy of the requested data is located. At step 70, control is returned to the protocol application so that the data can be read.

WriteFrame

Figure 5:
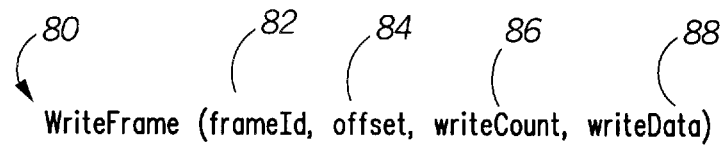
FIG. 5 is a representation of a write frame request provided by a protocol application to the data frame I/O in accordance with this invention.

Another basic protocol operation is the WriteFrame operation. A typical write frame request 80, FIG. 5, includes a frame identification, "frameId", 82 indicating the particular frame to which the application desires to write. The "offset" 84 indicates the number of bytes into the selected frame that the application would like to begin writing. The variable "writeCount" 86 indicates how many bytes are to be written. And, "writeData" 88 is the address of the data that the application desires to write.

Figure 6:
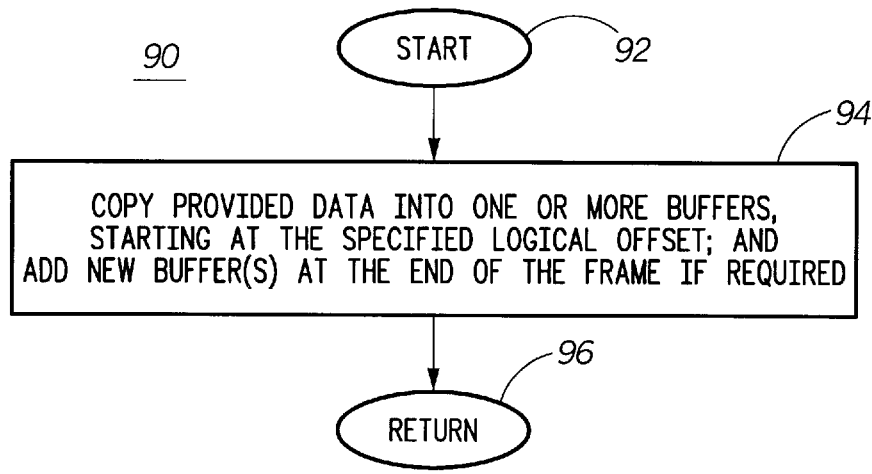
FIG. 6 is a flow chart illustrating the operation of the data frame I/O in accordance with this invention in response to a write frame request of the type shown in FIG. 5.

The WriteFrame operation, which is carried out in data frame I/O software 28, is depicted in flow chart 90, FIG. 6. The operation starts at step 92 when the protocol application provides API 34 with a WriteFrame request, such as request 80, FIG. 5. API 34 receives request 80, FIG. 5, from the protocol application and links the request to the WriteFrame routine, start step 92, in data frame I/O software 28 where the WriteFrame request is executed as follows. At step 94 data frame I/O device 10 copies the data from the writeData 88 location of the protocol application into the data frame stipulated in the request in buffer structure 14, FIG. 1, starting at the logical address in buffer structure 14. The logical address in buffer structure 14 is determined by data frame I/O software 28 from the request information, the frame data structure 26 and the linked buffers. If there is insufficient memory space in the linked buffers to accommodate the written data (i.e., buffer capacity is exceeded), data frame I/O device 10 will add one or more buffers to the data frame. Since the protocol applications are typically manipulating header information, if a buffer needs to be added it will usually be done at the front of the frame. At step 96, control is returned to the protocol application.

ReadLeading/ReplaceLeading

The protocol applications can also request another type of read frame operation without requiring that the application copy the portion of the data frame to be read. This read frame operation, ReadLeading, is performed in conjunction with another operation called ReplaceLeading. Together, the operations are used to read and replace header information in the data frame.

Figure 7:
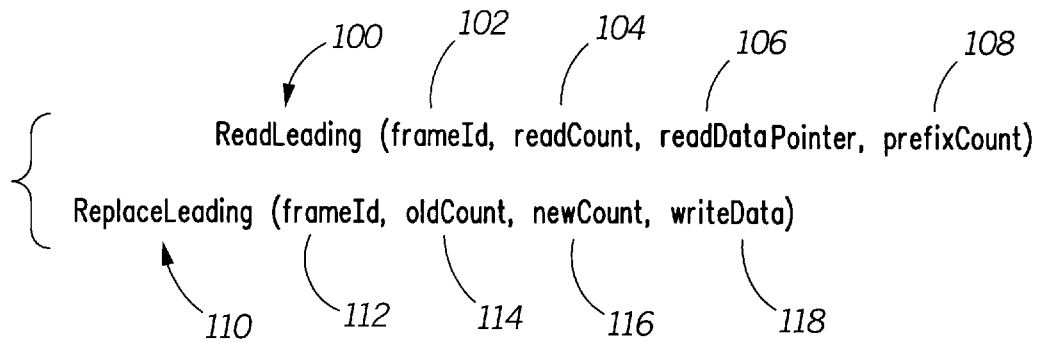
FIG. 7 is a representation of another type of read frame request, which reads the leading portion of a data frame, and a replace data request provided by a protocol application to the data frame I/O in accordance with this invention.

The ReadLeading request 100 may be constructed as shown in FIG. 7. Request 100 includes a frame identification, "frameId", 102 indicating the particular frame that the application desires to read. For ReadLeading requests there is no offset variable, as it is always equal to zero. This is because the ReadLeading request involves the reading of header information which is located at the front of the data frame. The variable "readCount" 104 stipulates how much of the data frame needs to be read. The variable "readDataPointer" 106 indicates the address of the protocol application pointer 52, FIG. 3. The "prefixCount" 108 indicates the number of bytes to be added to front of data frame as part of the new header information.

The ReplaceLeading request 110, FIG. 7, includes a frame identification, "frameId", 112 indicating the particular data frame that the application desires to replace the header information. The frameId is the same as the frameId of the corresponding ReadLeading request. The "oldCount" 114 indicates the length of the header to be replaced and the "newCount" 116 indicates the length of the header to be added to the data frame in place of the header to be replaced. The variable "writeData" 118 indicates the address of the data that will replace the old header.

Figure 8:
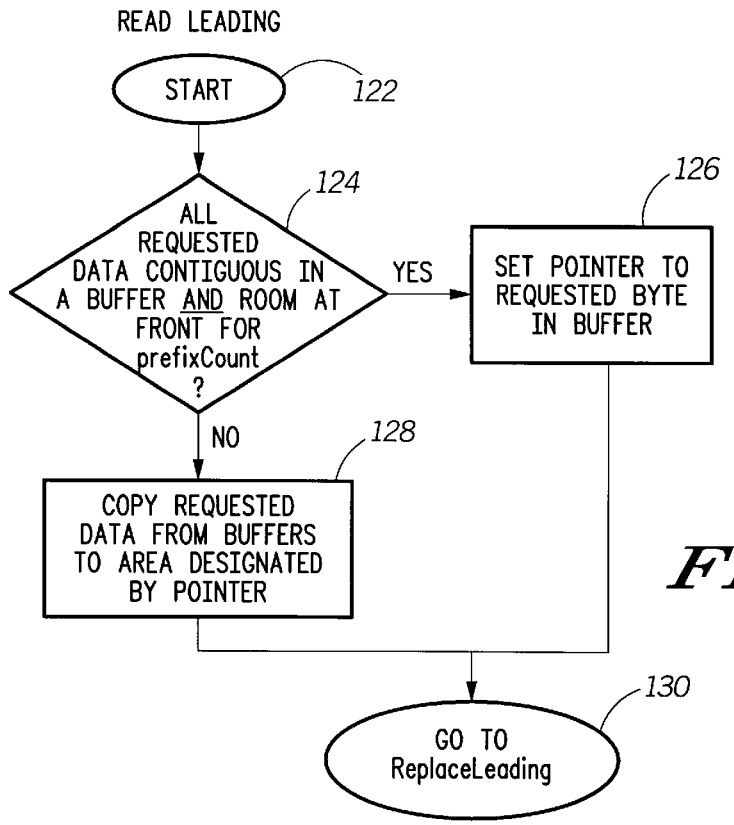
FIG. 8 is a flow chart illustrating the operation of the data frame I/O in accordance with this invention in response to a read frame request of the type shown in FIG. 7.

The ReadLeading operation executed by data frame I/O software 28 in data frame I/O device 10 is depicted in flow chart 120, FIG. 8. This operation begins at step 122 when the protocol application provides read/replace requests, such as requests 100 and 110, FIG. 7, to API 34. API 34 calls the ReadLeading routine of data frame I/O software 28 which uses the information in the request to locate in buffer structure 14 the portion of the data frame to be read. At step 124, it is determined if all requested data, i.e. the portion of the data frame to be read, is contiguous within a single buffer and if there is enough available memory space (i.e., equal to the prefixCount) in front of the data frame to accommodate the new header information. If there is, at step 126 the protocol application pointer 52, FIG. 3, is set to the address in buffer structure, 14, FIG. 1, at the front of the requested data frame. The protocol application is designed to look to the address contained in pointer 52. The protocol application initializes the pointer to contain the address of the Temp_read_string, stack location 50, FIG. 3. However, at step 126 this address is written over with the appropriate buffer structure address so that the application can read the portion of the data frame requested without having to copy the data to stack location 50. If at step 124 it is determined either that the portion of the data frame requested by the application does not reside in a single buffer or there is insufficient memory space in front of the data frame, then at step 128 the requested data is copied to the Temp_read_string, stack location 50, leaving sufficient room at the beginning to accommodate the new header size, if necessary. When the application looks to the address contained in pointer 52 it will be directed to stack location 50 where a copy of the requested data is located. The protocol application writes the new header data directly into buffer structure 14 or into the Temp_read_string, stack location 50. At step 130, the ReplaceLeading routine is called.

The most common type of operation that a protocol application will be required to perform is the ReadLeading/ReplaceLeading combination of operations because protocol applications are generally most concerned with reading and modifying the header information of the data frame. As noted above, in order to avoid copying of the header information in the ReadLeading operation, all of the data to be read must be contiguous within a buffer and there must be sufficient memory space (i.e., equal to the prefixCount) in the buffer in front of the data frame. In order to ensure that there will be sufficient space in front of the data frame, when the data frames are initially stored in the buffers, they are offset in the first buffer an by a number of bytes at least as great as the largest possible expansion of the header. In other words, when a data frame is stored in buffer structure 14, the first buffer containing the data frame has enough memory space available before the first byte of the data frame to accommodate the largest expected prefixCount.

Figure 9:
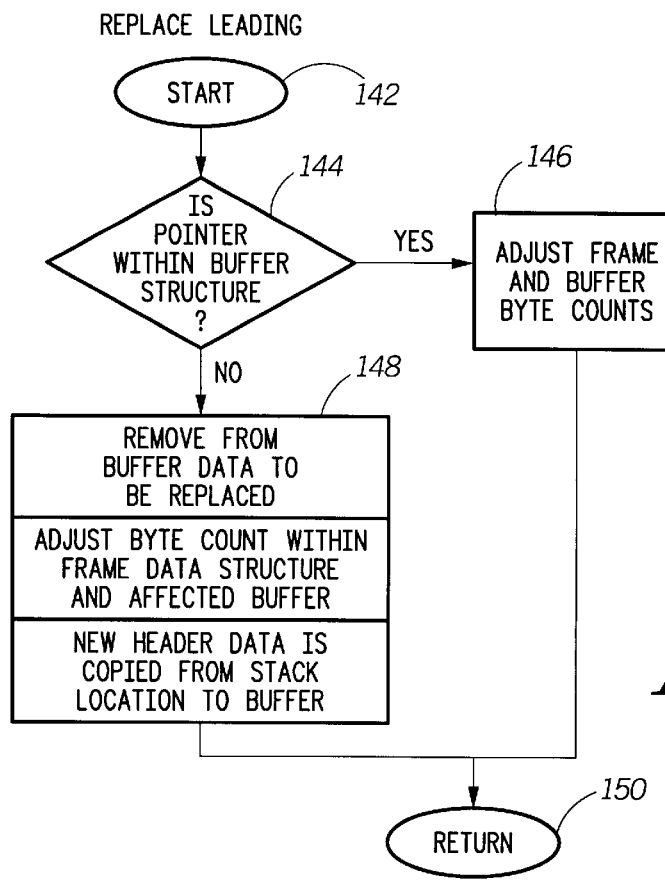
FIG. 9 is a flow chart illustrating the operation of the data frame I/O in accordance with this invention in response to a replace leading request of the type shown in FIG. 7.

The ReplaceLeading operation is depicted in flow chart 140, FIG. 9, and begins at step 142 when the ReadLeading operation is completed. At step 144 it is determined if the address in pointer 52 is within buffer structure 14 of data frame I/O device 10 indicating that no copy was required for the ReadLeading operation. If it is, at step 146 the frame byte count within the frame data structure and buffer byte count within the affected linked buffer are adjusted. If the pointer is not within buffer structure 14 of data frame I/O device 10 this indicates that a copy was required for the ReadLeading operation. At step 148 the data in buffer structure 14 to be replaced is removed, the frame byte count within frame data structure 26 and buffer byte count within the affected linked buffer are adjusted, and the new header data written into the Temp_read_string, stack location 50, is copied into buffer structure 14. After either step 146 or 148 is performed, at step 150 control is returned to the protocol application.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range within the equivalency of the claims are to be embraced within their scope.

What is claimed is:

1. A method of interfacing protocol application data frame operation requests with a data frame input/output device having a buffer structure containing data frames according to a buffer structure scheme, while maintaining isolation between the buffer structure and the protocol applications, the method comprising:

receiving, with an interface, from a protocol application a data frame operation request for operation on a portion of an identified data frame within the buffer structure;

linking, with the interface, the request to an appropriate data frame operation routine in the data frame input/output device; and the data frame operation routine executing the request, in conjunction with the protocol application, on the portion of the identified data frame without requiring that the protocol application have knowledge of the buffer structure scheme.

2. The method of claim 1 wherein the step of executing includes:

determining if the portion of the identified data frame resides in a single buffer of the buffer structure; and if the portion of the identified data frame resides in a single buffer of the buffer structure, providing the protocol application with the address of the portion of the identified data frame in the buffer structure to enable the protocol application to perform the data frame operation on the data frame in the buffer structure.

3. The method of claim 2 wherein the data frame operation request is a read frame request for reading a portion of the identified data frame.

4. The method of claim 3 wherein if the portion of the identified data frame does not reside in a single buffer of the buffer structure, the method further includes copying the portion of the identified data frame into a protocol application memory location to enable the protocol application to perform the data frame operation on the data frame in the memory location.

5. The method of claim 2 wherein the data frame operation request is a read leading frame request for reading a leading portion of the identified data frame and replacing the leading portion of the data frame with new header data.

6. The method of claim 5 wherein the step of determining if the portion of the identified data frame resides in a single buffer of the buffer structure includes determining if there is sufficient memory space in the buffer to accommodate the new header data.

7. The method of claim 6 wherein the step of providing is effected only if the portion of the identified data frame resides in a single buffer of the buffer structure and there is sufficient memory space in the buffer to accommodate the new header data.

8. The method of claim 6 wherein if the portion of the identified data frame does not reside in a single buffer of the buffer structure or there is insufficient memory space in the buffer to accommodate the new header data, the method further includes copying the portion of the identified data frame into a protocol application memory location to enable the protocol application to perform the data frame operation on the data frame in the memory location.

9. The method of claim 8 further including performing a replace leading operation which adjusts the data frame to account for new header data written by the protocol application including:

determining if the protocol application was provided with the address of the portion of the identified data frame in the buffer structure;

if the protocol application was provided with the address, adjusting the data frame and affected buffer sizes to account for the header data written by the protocol application; and if the portion of the identified data frame was copied into the protocol application memory location, removing from the data frame in the buffer structure the portion of the identified data frame; adjusting the data frame and affected buffer sizes; and copying from the protocol application memory location the new header data written by the protocol application into the portion of the identified data frame in the buffer structure.

10. The method of claim 1 wherein the data frame operation request is a write frame request and the write operation request contains the address of the data to be written, the location within the identified data frame, and the amount of data to be written; and wherein the step of executing includes copying the data to be written into the identified data frame at the location in the identified data frame contained in the request.

11. An apparatus for interfacing protocol application data frame operation requests with a data frame input/output device having a buffer structure containing data frames according to a buffer structure scheme, while maintaining isolation between the buffer structure and the protocol applications, comprising:

an interface adapted to receive from a protocol application a data frame operation request for operation on a portion of an identified data frame within the buffer structure;

the interface further adapted for linking the request to an appropriate data frame operation routine in the data frame input/output device; and wherein the data frame operation routine includes means for executing the request, in conjunction with the protocol application, on the portion of the identified data frame without requiring that the protocol application have knowledge of the buffer structure scheme.

12. The apparatus of claim 11 wherein the means for executing includes:

means for determining if the portion of the identified data frame resides in a single buffer of the buffer structure; and means for providing the protocol application with the address of the portion of the identified data frame in the buffer structure to enable the protocol application to perform the data frame operation on the data frame in the buffer structure if the portion of the identified data frame resides in a single buffer of the buffer structure.

13. The apparatus of claim 12 wherein the data frame operation request is a read frame request for reading a portion of the identified data frame.

14. The apparatus of claim 13 wherein the means for executing includes means for copying the portion of the identified data frame into a protocol application memory location to enable the protocol application to perform the data frame operation on the data frame in the memory location if the portion of the identified data frame does not reside in a single buffer of the buffer structure.

15. The apparatus of claim 12 wherein the data frame operation request is a read leading frame request for reading a leading portion of the identified data frame and replacing the leading portion of the data frame with new header data.

16. The apparatus of claim 15 wherein the means for determining if the portion of the identified data frame resides in a single buffer of the buffer structure includes means for determining if there is sufficient memory space in the buffer to accommodate the new header data.

17. The apparatus of claim 16 wherein the protocol application is provided with the address of the portion of the identified data frame in the buffer structure only if the portion of the identified data frame resides in a single buffer of the buffer structure and there is sufficient memory space in the buffer to accommodate the new header data.

18. The apparatus of claim 16 wherein there is further included means for copying the portion of the identified data frame into a protocol application memory location to enable the protocol application to perform the data frame operation on the data frame in the memory location if the portion of the identified data frame does not reside in a single buffer of the buffer structure or there is insufficient memory space in the buffer to accommodate the new header data.

19. The apparatus of claim 18 wherein the means for executing further includes means for performing a replace leading operation which adjusts the data frame to account for new header data written by the protocol application including:

means for determining if the protocol application was provided with the address of the portion of the identified data frame in the buffer structure;

means for adjusting the data frame and affected buffer sizes to account for the header data written by the protocol application if the protocol application was provided with the address; and means for removing from the data frame in the buffer structure the portion of the identified data frame; means for adjusting the data frame and affected buffer sizes; and means for copying from the protocol application memory location the new header data written by the protocol application into the portion of the identified data frame in the buffer structure if the portion of the identified data frame was copied into the protocol application memory location.

20. The apparatus of claim 1 wherein the data frame operation request is a write frame request and the write operation request contains the address of the data to be written, the location within the identified data frame, and the amount of data to be written; and wherein the means for executing includes means for copying the data to be written into the identified data frame at the location in the identified data frame contained in the request.

21. A computer useable medium having computer readable program code means embodied therein for interfacing protocol application data frame operation requests with a data frame input/output device having a buffer structure containing data frames according to a buffer structure scheme, while maintaining isolation between the buffer structure and the protocol applications, comprising:

computer readable program code means for receiving, by an interface, from a protocol application a data frame operation request for operation on a portion of an identified data frame within the buffer structure;

computer readable program code means for linking, by the interface, the request to an appropriate data frame operation routine in the data frame input/output device; and computer readable program code means for executing, by the routine, the request, in conjunction with the protocol application, on the portion of the identified data frame without requiring that the protocol application have knowledge of the buffer structure scheme.

22. A method of interfacing protocol application data frame operation requests with a data frame input/output device having a buffer structure containing data frames, the method comprising:

receiving a data frame operation request from a protocol application for operation on a portion of an identified data frame within the buffer structure;

determining if the portion of the identified data frame resides in a single buffer of the buffer structure; and if the portion of the identified data frame resides in a single buffer of the buffer structure, providing the protocol application with the address of the portion of the identified data frame in the buffer structure to enable the protocol application to perform the data frame operation on the data frame in the buffer structure.

23. The method of claim 22 wherein the step of receiving includes providing from the protocol application the protocol application data frame operation requests to an application program interface which links the request to the data frame input/output device.

24. The method of claim 22 wherein the data frame operation request is a read frame request for reading a portion of the identified data frame.

25. The method of claim 24 wherein if the portion of the identified data frame does not reside in a single buffer of the buffer structure, the method further includes copying the portion of the identified data frame into a protocol application memory location to enable the protocol application to perform the data frame operation on the data frame in the memory location.

26. The method of claim 22 wherein the data frame operation request is a read leading frame request for reading a leading portion of the identified data frame and replacing the leading portion of the data frame with new header data.

27. The method of claim 26 wherein the step of determining if the portion of the identified data frame resides in a single buffer of the buffer structure includes determining if there is sufficient memory space in the buffer to accommodate the new header data.

28. The method of claim 27 wherein the step of providing is effected only if the portion of the identified data frame resides in a single buffer of the buffer structure and there is sufficient memory space in the buffer to accommodate the new header data.

29. The method of claim 27 wherein if the portion of the identified data frame does not reside in a single buffer of the buffer structure or there is insufficient memory space in the buffer to accommodate the new header data, the method further includes copying the portion of the identified data frame into a protocol application memory location to enable the protocol application to perform the data frame operation on the data frame in the memory location.

30. The method of claim 29 further including performing a replace leading operation which adjusts the data frame to account for new header data written by the protocol application including:
   determining if the protocol application was provided with the address of the portion of the identified data frame in the buffer structure;
   if the protocol application was provided with the address, adjusting the data frame and affected buffer sizes to account for the header data written by the protocol application; and
   if the portion of the identified data frame was copied into the protocol application memory location, removing from the data frame in the buffer structure the portion of the identified data frame; adjusting the data frame and affected buffer sizes; and copying from the protocol application memory location the new header data written by the protocol application into the portion of the identified data frame in the buffer structure.

31. A method of interfacing a protocol application data frame write operation request with a data frame input/output device having a buffer structure containing data frames, the method comprising:
   receiving the data frame write operation request from a protocol application for writing data to an identified data frame within the buffer structure; the write operation request containing the address of the data to be written the location within the identified data frame, and the amount of data to be written; and
   the data frame input/output device copying the data to be written into the identified data frame at the location in the identified data frame contained in the request.

32. An apparatus for interfacing protocol application data frame operation requests with a data frame input/output device having a buffer structure containing data frames, comprising:
   means for receiving a data frame operation request from a protocol application for operation on a portion of an identified data frame within the buffer structure;
   means for determining if the portion of the identified data frame resides in a single buffer of the buffer structure; and
   means, responsive to the means for determining, for providing the protocol application with the address of the portion of the identified data frame in the buffer structure if the portion of the identified data frame resides in a single buffer of the buffer structure to enable the protocol application to perform the data frame operation on the data frame in the buffer structure.

33. The apparatus of claim 32 wherein the means for receiving includes means for providing from the protocol application the protocol application data frame operation requests to an application program interface which links the request to the data frame input/output device.

34. The apparatus of claim 32 wherein the data frame operation request is a read frame request for reading a portion of the identified data frame.

35. The apparatus of claim 34 further including means for copying the portion of the identified data frame into a protocol application memory location if the portion of the identified data frame does not reside in a single buffer of the buffer structure to enable the protocol application to perform the data frame operation on the data frame in the memory location.

36. The apparatus of claim 32 wherein the data frame operation request is a read leading frame request for reading a leading portion of the identified data frame and replacing the leading portion of the data frame with new header data.

37. The apparatus of claim 36 wherein the means for determining if the portion of the identified data frame resides in a single buffer of the buffer structure includes means for determining if there is sufficient memory space in the buffer to accommodate the new header data.

38. The apparatus of claim 37 wherein the means for providing provides the protocol application with the address of the portion of the identified data frame in the buffer structure only if the portion of the identified data frame resides in a single buffer of the buffer structure and there is sufficient memory space in the buffer to accommodate the new header data.

39. The apparatus of claim 37 further including means for copying the portion of the identified data frame into a protocol application memory location if the portion of the identified data frame does not reside in a single buffer of the buffer structure or there is insufficient memory space in the buffer to accommodate the new header data to enable the protocol application to perform the data frame operation on the data frame in the memory location.

40. The apparatus of claim 39 further including means for performing a replace leading operation which adjusts the data frame to account for new header data written by the protocol application including:
   means for determining if the protocol application was provided with the address of the portion of the identified data frame in the buffer structure;
   means for adjusting the data frame and affected buffer sizes to account for the header data written by the protocol application if the protocol application was provided with the address; and
   means for removing from the data frame in the buffer structure the portion of the identified data frame; means for adjusting the data frame and affected buffer sizes; and means for copying from the protocol application memory location the new header data written by the protocol application into the portion of the identified data frame in the buffer structure if the portion of the identified data frame was copied into the protocol application memory location.

41. An apparatus for interfacing a protocol application data frame write operation request with a data frame input/ output device having a buffer structure containing data frames, comprising:

means for receiving the data frame write operation request from a protocol application for writing data to an identified data frame within the buffer structure; the write operation request containing the address of the data to be written the location within the identified data frame, and the amount of data to be written; and means for copying the data to be written into the identified data frame at the location in the identified data frame contained in the request.

42. A computer useable medium having computer readable program code means embodied therein for interfacing protocol application data frame operation requests with a data frame input/output device having a buffer structure containing data frames, comprising:

computer readable program code means for receiving a data frame operation request from a protocol application for operation on a portion of an identified data frame within the buffer structure;

computer readable program code means for determining if the portion of the identified data frame resides in a single buffer of the buffer structure; and;

computer readable program code means, responsive to the means for determining, for providing the protocol application with the address of the portion of the identified data frame in the buffer structure if the portion of the identified data frame resides in a single buffer of the buffer structure to enable the protocol application to perform the data frame operation on the data frame in the buffer structure.

43. A computer useable medium having computer readable program code means embodied therein for interfacing a protocol application data frame write operation request with a data frame input/output device having a buffer structure containing data frames, comprising:

computer readable program code means for receiving the data frame write operation request from a protocol application for writing data to an identified data frame within the buffer structure; the write operation request containing the address of the data to be written the location within the identified data frame, and the amount of data to be written; and computer readable program code means for copying the data to be written into the identified data frame at the location in the identified data frame contained in the request.

* * * * *